United States Patent
Sumida

[19]

[11] Patent Number: 5,864,091
[45] Date of Patent: Jan. 26, 1999

[54] SHOCK RESISTANT ELECTRICAL CONNECTION BOX

[75] Inventor: Tatsuya Sumida, Yokkaichi, Japan

[73] Assignee: Sumitomo Wiring Systems, Ltd., Yokkaichi, Japan

[21] Appl. No.: 886,047

[22] Filed: Jul. 3, 1997

[30] Foreign Application Priority Data

Jul. 3, 1996 [JP] Japan .................................. 8-173512

[51] Int. Cl.⁶ .............................. H02G 3/14; H05K 5/03
[52] U.S. Cl. .......................... 174/50; 174/66; 220/3.92; 220/4.02; 220/3.8
[58] Field of Search .......................... 174/50, 66, 50.54; 220/3.8, 241, 3.94, 4.02, 392; 439/535, 76.1, 76.2, 248, 949, 384

[56] References Cited

U.S. PATENT DOCUMENTS

| | | | |
|---|---|---|---|
| 2,014,444 | 9/1935 | Miller | 174/50 X |
| 3,193,132 | 7/1965 | Gray | 220/3.8 |
| 3,320,601 | 5/1967 | Yankus | 174/66 X |
| 3,648,878 | 3/1972 | Mackay et al. | 174/66 X |
| 4,302,799 | 11/1981 | Behrens | 362/226 |
| 4,482,176 | 11/1984 | Rider, Jr. et al. | 174/52.1 X |
| 4,709,123 | 11/1987 | Yamashita et al. | 174/52.1 |
| 4,954,102 | 9/1990 | Ozaki et al. | 439/535 |

*Primary Examiner*—Dean A. Reichard
*Attorney, Agent, or Firm*—Oliff & Berridge, PLC

[57] ABSTRACT

When a car suffers a collision, a shock is applied to the body of an electrical connection box in the car. Due to the shock, an external force is applied horizontally to the peripheral wall of the body and the cover, thus crushing inverted V-shaped grooves formed on the bottom surface of the body and reducing the complementary angle θ between the two inclined surfaces of each inverted V-shaped groove. The external force applied horizontally to the peripheral wall of the body and the cover is also absorbed by the release of the cover from the body. The release of the cover from the body is accelerated by a force not absorbed by the deformation of the inverted V-shaped grooves but applied to the body vertically upwardly. Consequently, the effect of the external force applied to the electrical connection box is reduced. As a result of the absorption of the shock, a small degree of force is applied to a junction box or component in the box. Risk of damage to the junction box is reduced and disconnection of wiring from the junction box is unlikely.

12 Claims, 3 Drawing Sheets

SHOCK RESISTANT ELECTRICAL CONNECTION BOX

BACKGROUND OF THE INVENTION

1. Field of Invention

The present invention relates to an electrical connection box in general, and more particularly to an electrical connection box suitable for accommodating various kinds of electrical devices used in electrical circuits installed in the body of a car, e.g. in the engine room.

2. Description of Related Art

There have been proposed various types of electrical connection boxes accommodating a junction box in which electric wires branched from a wire harness for use in an electric circuit installed on a car body are connected. Such an electric connection box comprises a cover and a body accommodating the junction box. An example of such a prior art electrical connection box is disclosed in U.S. Pat. No. 4,954,102.

When a large mechanical shock is applied to the electrical connection box in the event of a collision of the car, the junction box is protected by the body and cover of the electrical connection box mounted in the engine room of the car body so that the junction box is deformed or damaged to a reduced degree by the shock.

There is, however, a demand for the development of an electrical connection box which allows the junction box to have a smallest possible degree of damage in the event of collision of the car, thus seeking to ensure the continued function of the junction box.

SUMMARY OF THE INVENTION

The present invention seeks to solve the above-described problem. Accordingly, it is an object of the present invention to provide an electrical connection box, for use in a vehicle, that protects an electrical device accommodated therein from mechanical shock, thus aiming to achieve continuing performance of the device when a shock is applied to a vehicle body.

The present invention provides in a first aspect an electrical connection box having mounted within it at least one electrical device, the electrical connection box comprising at least one shock-absorbing element arranged to reduce the effect on the electrical device of external force applied to the electrical connection box.

In a second aspect the invention provides an electrical connection box having mounted within it at least one electrical device, the electrical connection box comprising a body having at least one-predetermined deformation portion which is adapted to be preferentially deformed relative to other portions of the body upon application of at least a predetermined external force to the electrical connection box.

In a third aspect the invention provides an electrical connection box having mounted within it at least one electrical device, the electrical connection box comprising a body and a cover which are connected together at a connection, the connection being adapted and arranged to release the cover from the body upon application of at least a predetermined external force to the electrical connection box.

The invention thus provides an electrical protection box with one or more energy-absorbing portions, which provide protection against external shock. The energy-absorbing portion or portions are desirably arranged so that they absorb energy without disturbance of the electrical device installed in the box.

Preferably, the electrical connection box of the invention has both the features described above of a deformable portion or portions of the body and a cover which is released from the body with an energy absorbing effect.

The invention also relates to an electrical connection box as described above installed in a vehicle, particularly a road vehicle such as a car. It is preferred that a mounting member by which the electrical connection box is supported in the vehicle is attached to a side wall of the electrical connection box.

BRIEF DESCRIPTION OF THE DRAWINGS

These and other optional features and advantages of the present invention will be illustrated by the following description of preferred embodiments thereof given with reference to the accompanying drawings throughout which like parts are designated by like reference numerals, and in which.

DETAILED DESCRIPTION OF PREFERRED EMBODIMENTS

An electrical connection box embodying the present invention is described below with reference to FIGS. 1 to 5.

Figure 1:
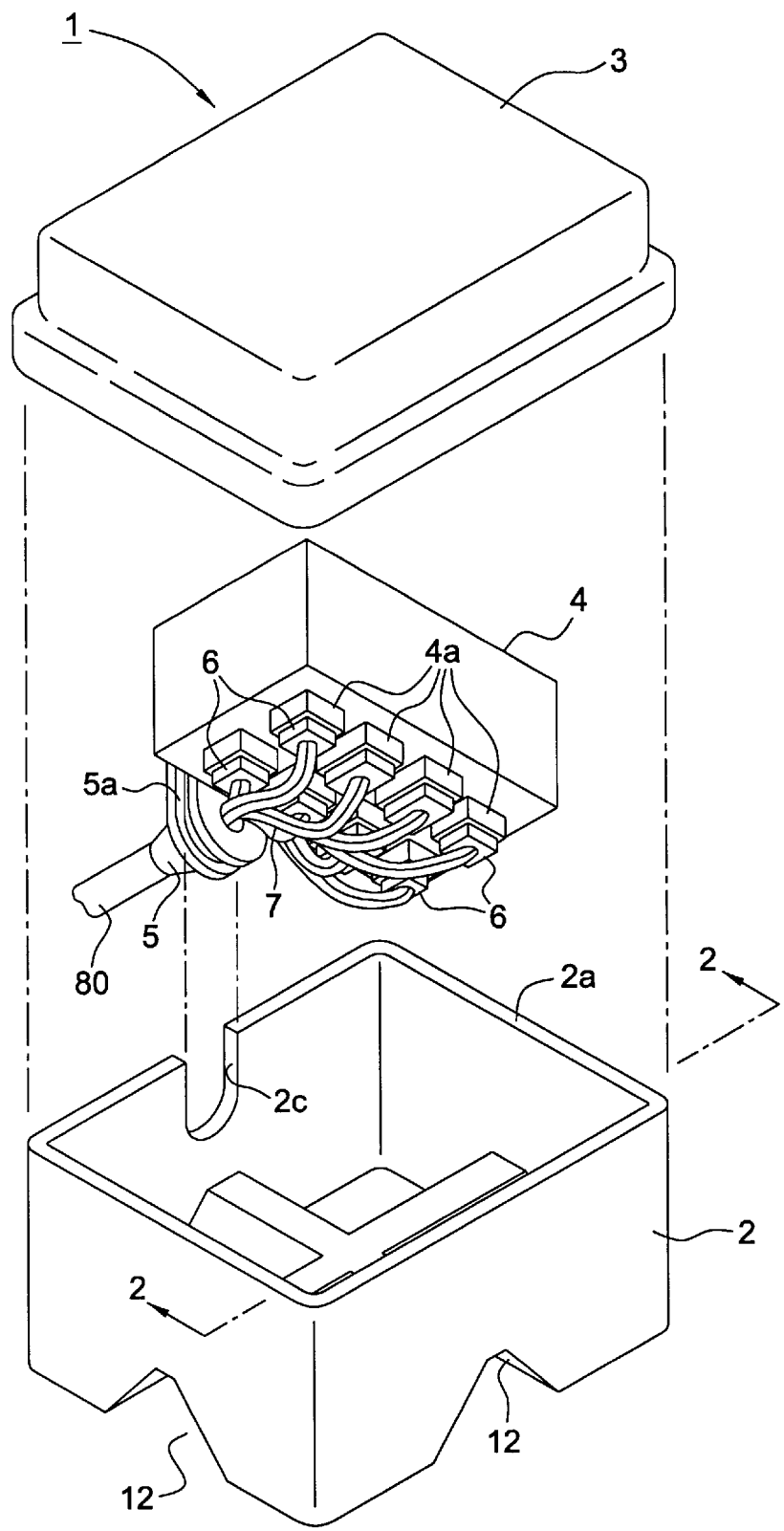
FIG. 1 is an exploded perspective view of an electrical connection box according to an embodiment of the present invention.

FIG. 1 is an exploded perspective view showing the electrical connection box 1 with the electrical device 4 viewed obliquely from below.

The electrical connection box 1 comprises a body 2 of generally rectangular solid shape and a cover 3 closing the open upper end 2a of the body 2. The body 2 and the cover 3 are made, for example, of a suitable synthetic resin material by means of injection molding. The body 2 accommodates an electrical device in the form of a junction box 4 having a plurality of connections 4a formed on its underside. Support portions 4b shown in FIG. 2 mount the junction box 4 in the connection box 1.

A U-shaped notch 2c is formed on a peripheral wall 2b of the body 2. A waterproof grommet 5 made, for example, of rubber is installed in the notch 2c. A locking groove 5a is formed on the peripheral surface of the waterproof grommet 5. The notch 2c is engaged by the locking groove 5a to prevent water from penetrating into the body 2 via a gap between the waterproof grommet 5 and the notch 2c.

A wire harness 80 comprising bundled wires 7 each having a connector 6 installed at the leading end thereof passes through the waterproof grommet 5. The connectors 6 are connected with the connections 4a of the junction box 4.

An accommodating groove 3c rectangular in section is formed on a peripheral wall 3b of the cover 3. A waterproof sealing packing 8 made of an elastic material is located on the base of the groove 3c. Thus, when the cover 3 is installed on the body 2, the peripheral wall 2b of the body 2 engages in the groove 3c, and the sealing packing 8 is sandwiched between the peripheral wall 2b of the body 2 and the base of the groove 3c of the cover 3. Consequently, water is prevented from penetrating into the electrical connection box 1 via a gap between the body 2 and the cover 3. There is no other connection, e.g. clip or latch, securing the cover 3 to the body 2. The cover 3 is normally held in place by frictional engagement at the groove 3c. The groove 3c disengages from the peripheral wall 2b of the body 2, when not less than a predetermined degree of external force is applied to the electrical connection box 1.

Figure 2:
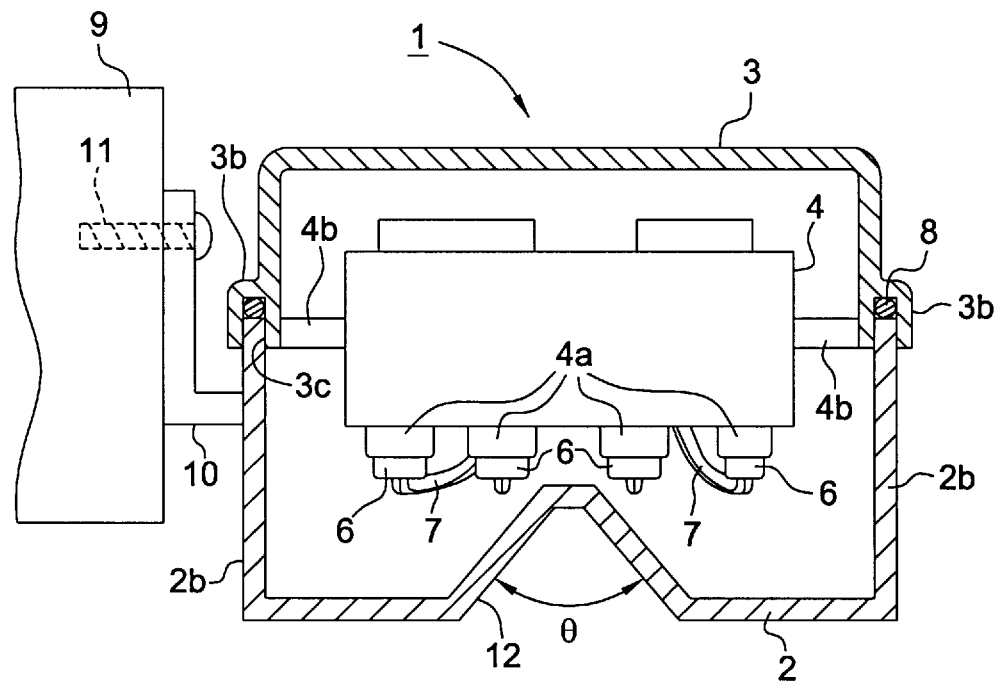
FIG. 2 is a sectional view taken along a line 2—2 of FIG. 1, showing the electrical connection box including its Cover.

Referring to FIG. 2, an installing member 10 for installing the electrical connection box 1 on a car body 9 is fixed to the peripheral wall 2b of the body 2. More specifically, one end of the installing member 10 which is L-shaped in section is fixed to the peripheral wall 2b of the body 2, whereas the other end thereof is fixed to the car body 9 by means of a screw 11. As shown, there is an installing member 10 at one side of the box only.

Figure 3:
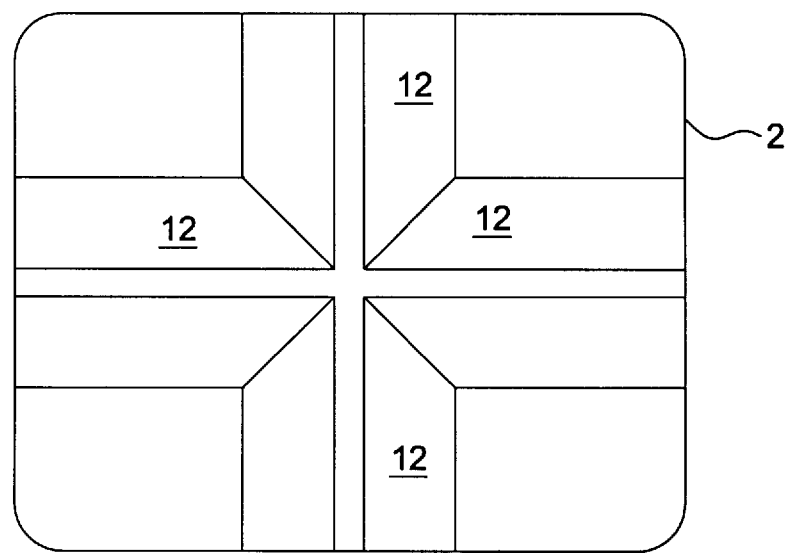
FIG. 3 is a bottom view of the bottom surface of the electrical connection box shown in FIG. 1.
Figure 4:
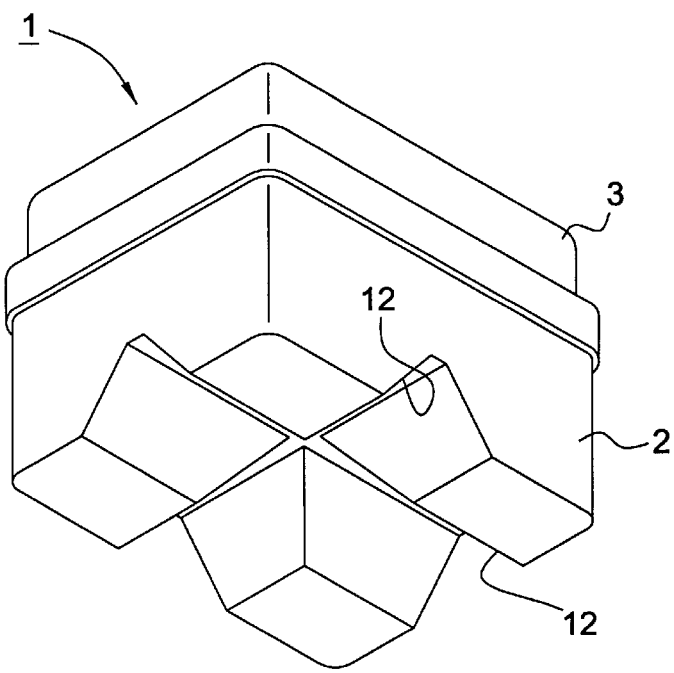
FIG. 4 is a perspective view from below the electrical connection box shown in FIG. 1.
Figure 5:
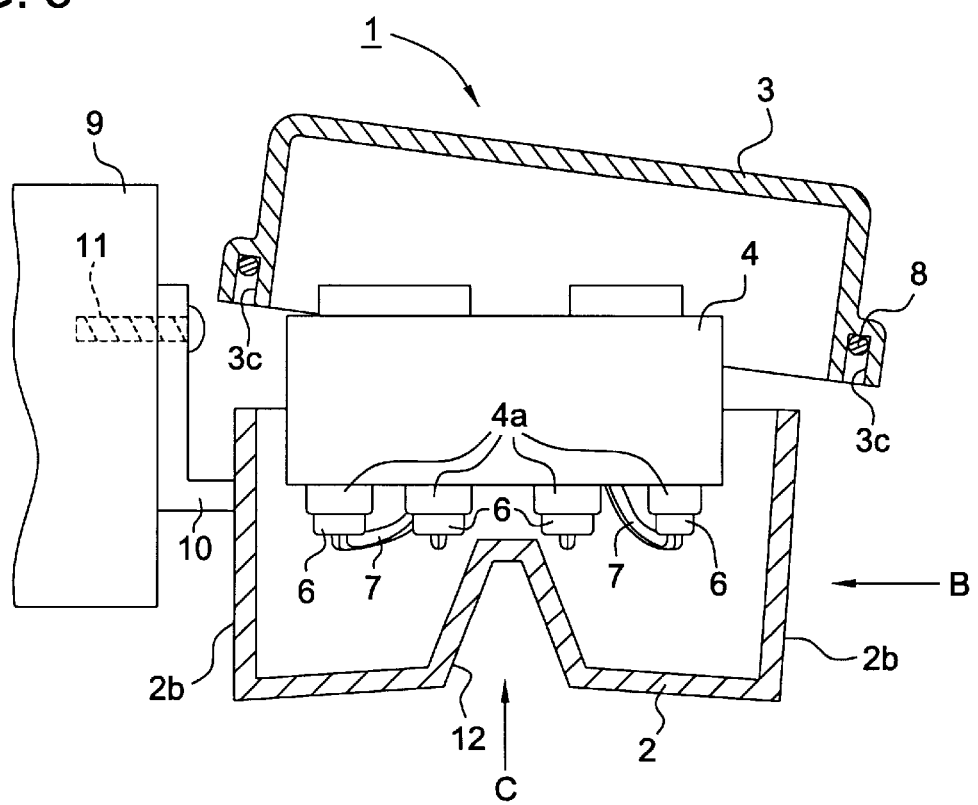
FIG. 5 is a sectional view for describing the operation of the electrical connection box shown in FIG. 1.

Referring to FIGS. 3 and 4, deformable portions in the form of two orthogonal inverted V-shaped grooves 12 are formed across from each other on the bottom surface of the body 2 such that one inverted V-shaped groove 12 extends lengthwise between opposite edges of the bottom surface and the other inverted V-shaped groove 12 extends widthwise between the other two opposite edges of the bottom surface. In this embodiment the wall thickness of the walls of the grooves 12 is the same as the wall thickness of other parts of the body 2. Referring to FIG. 2, at least one of the inverted V-shaped grooves 12 is crushed when not less than the predetermined degree of external force is applied to the electrical connection box 1, with the result that the complementary angle θ formed by the two inclined surfaces of each inverted V-shaped groove 12 becomes smaller.

The operation and effect of the electrical connection box 1 are described below.

The electrical connection box 1 is installed inside the engine room of the car body 9, with the cover 3 mounted on the body 2. When the car suffers a collision, a shock is applied horizontally to the body 2. As a result, an external force is applied to the inverted V-shaped grooves 12 as well as the peripheral wall 2b of the body 2 and the peripheral wall 3b of the cover 3, thus crushing the respective inverted V-shaped grooves 12 and reducing the complementary angle θ. The grooves 12 are shaped and arranged to be preferentially or initially crushed by external force on the box. Consequently, the external force B (FIG. 5) applied horizontally to the peripheral wall 2b of the body 2 is absorbed by the deformation of the respective inverted V-shaped grooves 12 and thus the effect of the horizontal external force is reduced. A residual part of the horizontal external force, namely, a force not absorbed by the deformation of the inverted V-shaped grooves 12, is vertically upwardly applied to the electrical connection box 1, as shown by an arrow C of FIG. 5.

In addition to the deformation of the inverted V-shaped grooves 12, the external force causes the peripheral wall 2b of the body 2 to disengage from the accommodating groove 3c of the peripheral wall 3b, with the result that the cover 3 is loosened or removed from the body 2. Consequently, the external force applied horizontally to the peripheral walls 2b and 3b is also absorbed by the disengagement of the cover 3 from the body 2. The external force applied to the body 2 vertically upwardly accelerates the disengagement of the cover 3 from the body 2.

As a result of the absorption of the shock, only a small degree of external force is applied to the junction box 4. Accordingly, the risk that the junction box 4 is destroyed and thus the connectors 6 are removed from the connections 4a of the junction box 4 is avoided or much reduced.

As noted, each of the shock-absorbing effects of the box 1 is obtained when a predetermined force or a force greater than that predetermined force is applied. Typically this predetermined external force is a horizontal force applied at a mounting of the box 1, particularly a mounting fixed to a side wall of the box.

As apparent from the foregoing description, the electrical connection box 1 absorbs the shock generated on collision of the car, thus reducing risk of the destruction of the junction box 4 and the removal of the connectors 6 from the connections 4a. Consequently, the functioning of the junction box 4 can be maintained.

The above-described embodiment can be modified, for example, as described below. The modified electrical connection box has operation and effect similar to those of the illustrated embodiment.

(1) The sectional shape of each of the inverted V-shaped grooves 12 can be appropriately modified to enhance the operation and effect of the embodiment.

(2) Three or more inverted V-shaped grooves 12 can be radially formed on the bottom surface of the body 2.

(3) The body 2 and the cover 3 can be made of a material which is destroyed when not less than a predetermined degree of external force is applied to the electrical connection box 1 at the time of the collision of the car. In this manner, the modified electrical connection box is capable of absorbing a greater shock applied thereto due to the destruction of the body 2 and the cover 3, thus enhancing the operation and effect of the embodiment.

(4) The corners of the body 2 and that of the cover 3 can be relatively thinly formed to allow them to be readily deformable when not less than a predetermined degree of external force is applied to the modified electrical connection box. The modified electrical connection box is more efficiently capable of absorbing the shock applied thereto than an electrical connection box not including such a structure.

(5) A shock-absorbing material (butyl rubber, a gel, or the like) may be installed on the wall surfaces of at least one of the body 2 and the cover 3. This assists in the absorption of shock loads.

(6) The electrical connection box 1 can be used to accommodate electrical devices such as an electronic control unit (ECU), a relay box, or the like in addition or alternatively to accommodating the junction box.

Although the present invention has been fully described in connection with preferred embodiments thereof with reference to the accompanying drawings, it is to be noted that various changes and modifications will be apparent to those skilled in the art. All such changes and modifications are to be understood as included within the scope of the present invention.

What is claimed is:

1. An electrical connection box for mounting at least one electrical device in a vehicle, said electrical connection box comprising a body including side walls and a base wall, said base wall having a predetermined discontinuous portion defining at least one deformable shock-absorbing element arranged to reduce any effect on said at least one electrical device of an external force applied to said electrical connection box.

2. An electrical connection box according to claim 1, further comprising an installing member for installing the electrical connection box in the vehicle.

3. An electrical connection box according to claim 1, further comprising a cover and a connection between said body and said cover, the connection being arranged to release said cover from said body upon application of at least the external force to said electrical connection box.

4. An electrical connection box according to claim 3, further comprising an installing member for installing the body in the vehicle.

5. An electrical connection box according to claim 1, further comprising supports that suspend the at least one electrical device in a position that is spaced away from the at least one deformable shock absorbing element.

6. An electrical connection box for mounting at least one electrical device, said electrical connection box comprising a body having at least one predetermined deformable portion structured to be preferentially deformed relative to other portions of said body upon application of at least a predetermined external force to said electrical connection box, wherein said body has a base wall and said at least one predetermined deformable portion comprises at least one groove-shaped portion of said base wall.

7. An electrical connection box according to claim 5, wherein said at least one groove-shaped portion of said base wall has an inverted V-shape.

8. An electrical connection box according to claim 5, wherein said at least one groove-shaped portion comprises a pair of said groove-shaped portions extending in respective longitudinal directions that are orthogonal to one another.

9. An electrical connection box for mounting at least one electrical device, said electrical connection box comprising a body and a cover that are connected together at a connection, said body including at least one predetermined area of weakness, the connection being structured to release said cover from said body when the at least one predetermined area of weakness is caused to deform by at least a predetermined external force applied to said body.

10. An electrical connection box according to claim 9, further comprising an installing member for installing the body in a vehicle.

11. An electrical connection box for mounting at least one electrical device, said electrical connection box comprising a body having at least one predetermined deformation portion structured to be preferentially deformed relative to other portions of said body upon application of at least a predetermined external force to said body, said electrical connection box further having a cover, said body and said cover being connected together at a connection structured to release said cover from said body upon application of at least the predetermined external force to said body.

12. An electrical connection box according to claim 11, further comprising an installing member for installing the body in a vehicle.

* * * * *